Sept. 9, 1958 G. L. HELLER 2,851,337
CARBON BLACK PROCESS
Filed Aug. 22, 1951
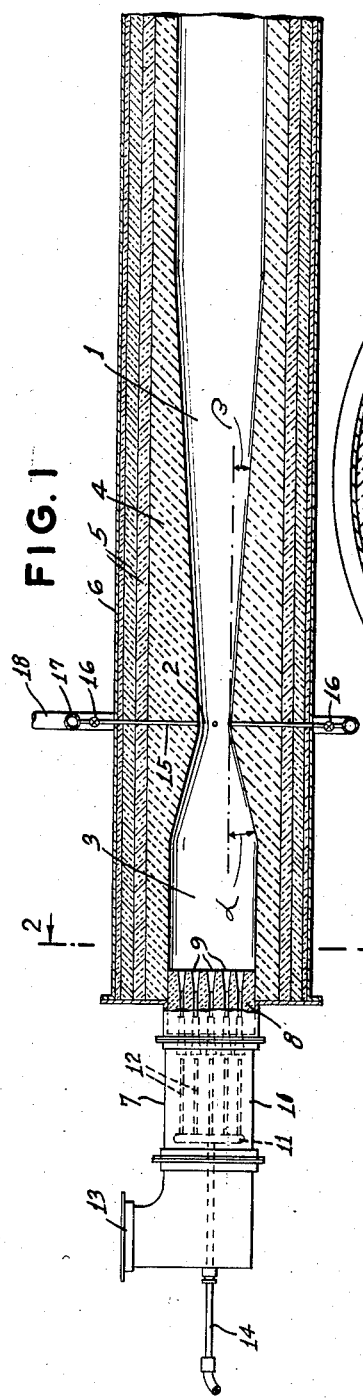
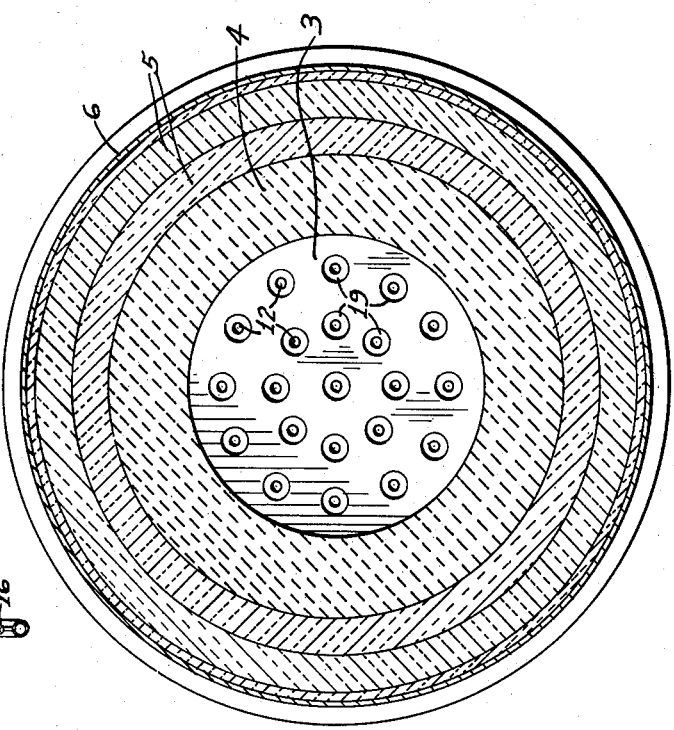
INVENTOR
George L. Heller
BY
Pennie, Edmonds, Morton, Barrows & Taylor
ATTORNEYS United States Patent Office 2,851,337
Patented Sept. 9, 1958

2,851,337

CARBON BLACK PROCESS

George L. Heller, Monroe, La., assignor to Columbian Carbon Company, New York, N. Y., a corporation of Delaware Application August 22, 1951, Serial No. 243,019

4 Claims. (Cl. 23—209.4)

The present invention relates to the production of furnace blacks by the decomposition of hydrocarbons and, more particularly, to a furnace black process of the type in which the hydrocarbon is decomposed by rapidly mixing it with a stream of hot gases passing through an elongated, heat insulated reaction chamber. An operation of that type is described, for instance, in the Wiegand and Braendle Patent No. 2,378,055.

In the process described in the patent just noted, the hydrocarbon to be decomposed, hereinafter referred to as hydrocarbon make, is injected into a separately generated, turbulent stream of hot blast flame gases, flowing through an elongated, heat insulated reaction chamber of substantially uniform cross-sectional area so that the hydrocarbon make is rapidly mixed with the blast flame gases and quickly and uniformly heated to its decomposition temperature and decomposed by heat absorbed therefrom. The resultant gaseous mixture continues through the reaction chamber in a state of high turbulence and the gaseous mixture, with carbon black suspended therein, is passed from the downstream end of the chamber, cooled, and the carbon black separated and collected.

It has been found in operations of the type described that the character of the resultant carbon black is materially affected by the rapidity and uniformity of the mixing of the hydrocarbon make with the hot blast flame gases. Notably, the particle size and rubber compounding characteristics of the resultant carbon black are materially affected thereby. Generally, the more rapid and thorough mixing, the smaller the carbon black particles.

Due to the high velocity and high turbulence of the blast flame gases, the mixing of the hydrocarbon make therewith is generally so rapid that it might well be designated instantaneous. However, the rate of pyrolysis of the hydrocarbon make upon contact with the hot blast flame gases is, likewise, very rapid and generally increases with an increase in temperature and in the length of the molecular chain of the hydrocarbon. The time factors involved in the mixing and initiation of the pyrolysis appears to be measurable in micro-seconds.

The use of heavier, normally liquid hydrocarbons as raw materials for producing carbon black has become increasingly important. Most heavier hydrocarbons available for that purpose, for instance, heavy, relatively low cost residuum, cannot be vaporized without excessive cracking, and therefore their use has required that they be injected into the reaction chamber in liquid form. Where so used, the difficulty of uniformly dispersing the hydrocarbons in the hot gases is greatly increased and this is further complicated by their rapid decomposition rate.

Since it is generally desirable that the hydrocarbon make be thoroughly dispersed in the hot gases before pyrolysis has progressed to the point where carbon particles are formed, the rate of uniform mixing becomes increasingly important where higher molecular weight hydrocarbons are used as the make, as distinguished from natural gas, which consists principally of methane. Various methods have been proposed to promote the more rapid and uniform mixing of these heavier hydrocarbons with the blast flame gases.

It is the purpose of the present invention further to reduce the time interval between initial contact of the hydrocarbon make with the hot gases and the uniform, complete dispersion of the hydrocarbon make therein.

This is accomplished in accordance with my present invention by greatly increasing the rate of linear flow and turbulence of the hot gases at the zone of the chamber into which the hydrocarbon make is injected, the linear velocity of the gases through the zone of make gas injection advantageously being not less than 150 feet per second, preferably not less than 200 feet per second and ranging as high as 4,000 feet per second.

In operations of the type described, one has heretofore been considerably limited as to the velocity of the blast flame gases for the reason that one is limited as to the volume of blast flame gases relative to the volume of the hydrocarbon make in order to obtain economically a carbon black of the desired characteristics. The period of time for which the hydrocarbon make and the resultant carbon particles are in contact with the hot gases, i. e., contact time, is also an important factor. These have been limiting factors in attempts to increase velocities and turbulence within the reaction chamber.

It has previously been proposed to effect mixing of the hydrocarbon make with hot products of combustion by passing the latter through a relatively short abrupt throat and injecting the hydrocarbon gases into the hot combustion product at the zone of constriction. However, such previous proposals are unsuitable for my present purpose.

In operations of the type to which the present invention relates, it is important that no obstructions be placed in the path of the gases upon which the hydrocarbon in the process of decomposition would be caused to impinge. Further, it is essential that the hot gaseous mixture be maintained in a state of violent turbulence for a considerable period following the injection of the hydrocarbon make and that the hydrocarbon be uniformly subjected to the operating conditions both with respect to temperature and time.

To effect such conditions it has heretofore been proposed, in operations of this type, that the reaction chamber be of substantially uniform cross-section, that is, without constrictions. It has been thought that substantial constrictions within the reaction chamber were objectionable.

I have now found that the reaction chamber may, with advantage, be materially constricted at the zone of hydrocarbon make injection provided certain conditions with respect thereto, as hereinafter more fully described, be carefully observed.

In order to generate the required volume of blast flame gases at the required temperature, it is generally advantageous that the combustion chamber be of considerable transverse area. Further, in order to provide the necessary time factor, or contact time, without excessively extending the reaction chamber, it is advantageous that the reaction chamber likewise be of considerable transverse area. I have found, however, that the zone into which the hydrocarbon make is injected may be considerably constricted without deleteriously affecting the operation, yield, or character of the product, provided the angles of constriction and expansion be sufficiently small, i. e., that the inward slope and subsequent expansion of the chamber be sufficiently gradual to avoid pockets in which eddy currents may be established.

To effect these conditions, I have found that the inward slope or taper of the chamber walls should form, with the longitudinal axis of the chamber, an angle not materially exceeding about 11° and that the outward slope of the chamber walls should be even more gradual forming an angle with said longitudinal axis not exceeding about 4°. I have obtained more satisfactory results where the angle of slope upstream from the zone of maximum constriction is 10½° and the angle of slope downstream from that point is 3½°. The extent of the constriction is subject to variation. Optimum constriction will depend to a large extent upon permissable back pressure and the desired velocity increase. Generally, with a chamber of circular cross-section it is advantageous that the diameter will be decreased by at least 50%. For instance, with a circular chamber one foot in diameter, excellent results of circular cross-section it is advantageous that the diameter of four inches at the zone of make injection.

Predicated upon these discoveries, the process of my present invention provides improvements in the process of the type described comprising the steps of generating the hot combustion gases in a combustion chamber and passing the resultant gases as a high velocity, turbulent stream through an elongated, unobstructed heat insulated chamber, gradually reducing the transverse area of the stream so as further to increase its velocity and turbulence, injecting the hydrocarbon to be decomposed into the stream of hot gases passing through the constricted zone of the chamber and then gradually increasing the transverse area of the resultant stream and maintaining high velocity, violently turbulent flow of the resultant mixture as it continues through the chamber.

The invention will be described and illustrated with reference to the accompanying drawing, which represents conventionally and somewhat diagrammatically, apparatus especially adapted to the carrying out of the process and in which Figure 1 represents a longitudinal, vertical sectional view, and Figure 2 represents a transverse sectional view along the line 2—2 of Figure 1.

In the drawing, the elongated reaction chamber 1 is provided intermediate its ends with a constricted zone 2 in the form of a Venturi-shaped throat to the left of which there is provided a combustion chamber 3. The entire chamber is lined by a layer of furnace refractory 4 which, in turn, is covered by layers 5 of heat-insulating material, all enclosed in an outer metal casing 6.

In the specific apparatus shown, the chamber is of cylindrical cross-section, but it will be understood that the chamber may be rectangular, or of other cross-sectional configuration.

The upstream end of the combustion chamber is provided with a blast burner head 7 comprising a burner block 8, through which there extend burner ports 9 and which also comprises a wind-box 10, which encloses the outer end of the burner block and also fuel gas manifolds 11 and spuds 12, as more fully shown, for instance, in United States Patent No. 2,529,873, to Wiegand and Braendle.

In operation, air for combustion is supplied to the wind-box through inlet 13 and fuel gas is supplied through line 14 leading through the wind-box into the fuel gas manifolds 11.

Blast burners of the type indicated have been found to be particularly advantageous in the process and apparatus to which the present invention relates. It will be understood, however, that any type of burner adapted to produce a violently turbulent stream of hot blast flame gases may be employed without departing from my present invention.

The Venturi-shaped throat of the reaction chamber, as shown in the drawing, is formed by gradually constricting the cross-sectional area of the chamber and thereafter gradually expanding its cross-sectional area. The angle of constriction α is approximately 10½° and the angle of expansion β in the apparatus shown is approximately 3½°. It will be understood that these angles of constriction and expansion may be varied somewhat, but generally should not exceed 11° and 4°, respectively.

At the zone of maximum constriction, i. e., the zone of maximum velocity of the hot blast flame gases, there is provided a plurality of hydrocarbon make injection tubes 15 extending axially through the walls of the furnace chamber and entering the chamber substantially perpendicular to the longitudinal axis thereof. Each of these tubes is provided at its outer end with a valve 16 adapted to adjust the flow of hydrocarbon therethrough and is connected to bustle pipe 17 to which the hydrocarbon make is supplied through line 18.

The make gas injection arrangement shown is particularly adapted to operations in which the hydrocarbon make is supplied as a gas or vapor. The invention also contemplates operations in which the hydrocarbon to be decomposed is normally liquid and is injected into the hot combustion gases as a liquid spray. Under such conditions, the inner ends of the hydrocarbon injection tubes will usually be provided with spray nozzles of suitable type, such, for instance, as shown in my copending application Serial No. 195,529, filed November 14, 1950, now Patent No. 2,659,662.

Also, in the apparatus shown, the hydrocarbon make injection tubes are represented as entering the chamber in a direction substantially perpendicular to the longitudinal axis of the chamber. Though such arrangement has been found particularly advantageous, since it further promotes the rapid mixing of the hydrocarbon make with the combustion gases, it will be understood that the hydrocarbon make may be otherwise injected into the constricted zone of the chamber without departing from the spirit of my present invention.

Normally, in the apparatus, two or more hydrocarbon make injection tubes will be employed, advantageously four tubes spaced at angles of about 90°.

It has been found highly desirable in operations of this sort to generate the hot blast flame gases by injecting into the upstream end of the combustion chamber a plurality of high velocity streams of combustible mixture uniformly spaced over the entire transverse area of the chamber, as more clearly shown in Fig. 2 of the drawings. It will be noted, however, that the apparatus of the present invention, in its broader aspect, is not so restricted.

In carrying out the process in the apparatus shown, air for combustion, as previously noted, will be supplied through inlet 13 to the wind-box 10 under superatmospheric pressure and forced into the combustion chamber through the ports 9. Fuel gas supplied through line 14 is jetted by the spuds 12 into the air streams passing through the respective burner ports and is mixed therewith and the mixture burned in the combustion chamber 3 to form a violently turbulent, high velocity stream of blast flame gases at a temperature in excess of that at which the hydrocarbon decomposes to form carbon black.

The velocity and turbulence of these blast flame gases is further increased in passing through the Venturi throat 2 to a linear velocity not less than 150 feet per second and advantageously substantially in excess thereof, preferably not less than 200 feet per second and ranging up to as high as 4,000 feet per second.

The hydrocarbon to be decomposed is injected into these blast flame gases, advantageously at the zone of maximum velocity and turbulence, through injection tubes 15 and is rapidly and uniformly mixed with the hot gases and decomposed by heat absorbed therefrom to form carbon black in suspension as the hot mixture continues at a somewhat diminished, but still high velocity and in a condition of violent turbulence, through the chamber.

From the downstream end of the chamber, the effluent furnace gases with carbon black suspended therein are passed to conventional cooling and separating apparatus for the recovery of the carbon black.

The temperature of the hot combustion gases with which the hydrocarbon gas is mixed is subject to considerable variation, depending upon the type of hydrocarbon to be decomposed and the characteristics of the product desired. Normally, these blast flame gases will range in temperature from about 2,000° F. to 3,000° F., and, consequently, it is important that the inner wall of the chamber be of highly refractory material, advantageously, silicon carbide, or the like.

In operations of the type described in which both the fuel gas and hydrocarbon make were natural gas of 960 B. t. u. value and the hot blast flame gases were passed through the Venturi throat at a velocity of 158 feet per second and a temperature of 2,620° F., I have produced furnace blacks having a color value of 152, tinting strength of 124, and oil absorption value of 6.2. One of the outstanding characteristics of the present process which is frequently advantageous, is its adaptability to the production of a furnace black of relatively low oil absorption value which is indication of low structure characteristics of the black.

A particularly advantageous characteristic of the process is its flexibility, which makes possible the production of furnace carbons of widely different properties. For instance, in other operations similar to that just described, in which the hydrocarbon make was natural gas enriched to a B. t. u. value of 1,520 by the mixing of higher molecular weight hydrocarbons therewith, I have obtained furnace blacks of the following characteristics:

|  | Color | Tinting Strength | Oil Absorption |
|---|---|---|---|
| Sample I | 98 | 68 | 8.1 |
| Sample II | 114 | 89 | 7.4 |
| Sample III | 157 | 132 | 7.1 |

I claim:
1. In the process of producing carbon black by thermally decomposing hydrocarbons in which a combustible mixture of a fluid fuel and oxygen-containing gas is blasted into one end of an enlongated, unobstructed, heat-insulated chamber and burned therein to produce a violently turbulent stream of blast flame gases passing longitudinally through the chamber at a temperature sufficiently high to thermally decompose the hydrocarbons and the hydrocarbons to be decomposed are separately and forcefully injected into and mixed with said stream of blast flame gases while the latter is passing through the reaction chamber and at a point removed from the point of introduction of said combustible mixture and in such quantity that the resultant mixture is at the decomposition temperature of the hydrocarbons, continuing the flow of the mixture through the elongated chamber at high temperature and high turbulence, thereby decomposing the hydrocarbons by heat absorbed from the hot blast flame gases to form carbon black in suspension, the suspension is removed from the far end of the reaction chamber and the carbon separated from the effluent gases, the steps of gradually reducing the transverse area of the stream of blast flame gases as it passes through an intermediate zone of the chamber by inwardly sloping confining walls, separately injecting the hydrocarbons to be decomposed as confined streams directly into the stream of hot gases passing through the confined zone of said constriction and then gradually increasing the transverse area of the resultant gas stream while maintaining violently turbulent flow as the gases continue through the chamber.

2. The process of claim 1 in which the velocity of the hot gases at the zone of injection of the hydrocarbon is within the range of 200 feet per second to 4,000 feet per second.

3. The process of claim 1 in which the hydrocarbon to be decomposed is injected into the stream of hot gases at substantially right angles to the direction of flow of the hot gas stream.

4. The process of claim 1 in which the hydrocarbon to be decomposed is a high molecular weight, normally liquid hydrocarbon and is injected into the stream of hot gases in the form of a liquid spray.

References Cited in the file of this patent
UNITED STATES PATENTS

| 1,448,655 | Darrah | Mar. 13, 1923 |
| 1,981,150 | Pyzel | Nov. 20, 1934 |
| 2,129,269 | Furlong | Sept. 6, 1938 |
| 2,140,316 | Furlong | Dec. 13, 1938 |
| 2,217,649 | Goddard | Oct. 8, 1940 |
| 2,368,827 | Hanson | Feb. 6, 1945 |
| 2,377,847 | Allen | June 12, 1945 |
| 2,378,055 | Weigand et al. | June 12, 1945 |
| 2,408,111 | Truax | Sept. 24, 1946 |
| 2,434,298 | Truax | Jan. 13, 1948 |
| 2,440,423 | Weigand | Apr. 27, 1948 |
| 2,440,424 | Weigand | Apr. 27, 1948 |
| 2,529,873 | Heller | Nov. 14, 1950 |
| 2,549,240 | Robinson | Apr. 17, 1951 |
| 2,572,664 | Robinson | Oct. 23, 1951 |
| 2,616,794 | Krejci | Nov. 4, 1952 |
| 2,616,795 | Krejci | Nov. 4, 1952 |

UNITED STATES PATENT OFFICE
CERTIFICATE OF CORRECTION

Patent No. 2,851,337                        September 9, 1958

George L. Heller

It is hereby certified that error appears in the printed specification of the above numbered patent requiring correction and that the said Letters Patent should read as corrected below.

Column 3, line 14, strike out "of circular cross-section it is advantageous that the" and insert instead -- have been obtained by constricting the chamber to a --.

Signed and sealed this 9th day of December 1958.

(SEAL)
Attest:

KARL H. AXLINE                             ROBERT C. WATSON

Attesting Officer                              Commissioner of Patents